July 16, 1940.  P. E. MATTHEWS  2,208,133
VACUUM CLUTCH CONTROL
Filed April 27, 1938   2 Sheets-Sheet 1

INVENTOR
Philip E. Matthews
BY
Hoguet, Neary & Campbell
ATTORNEYS

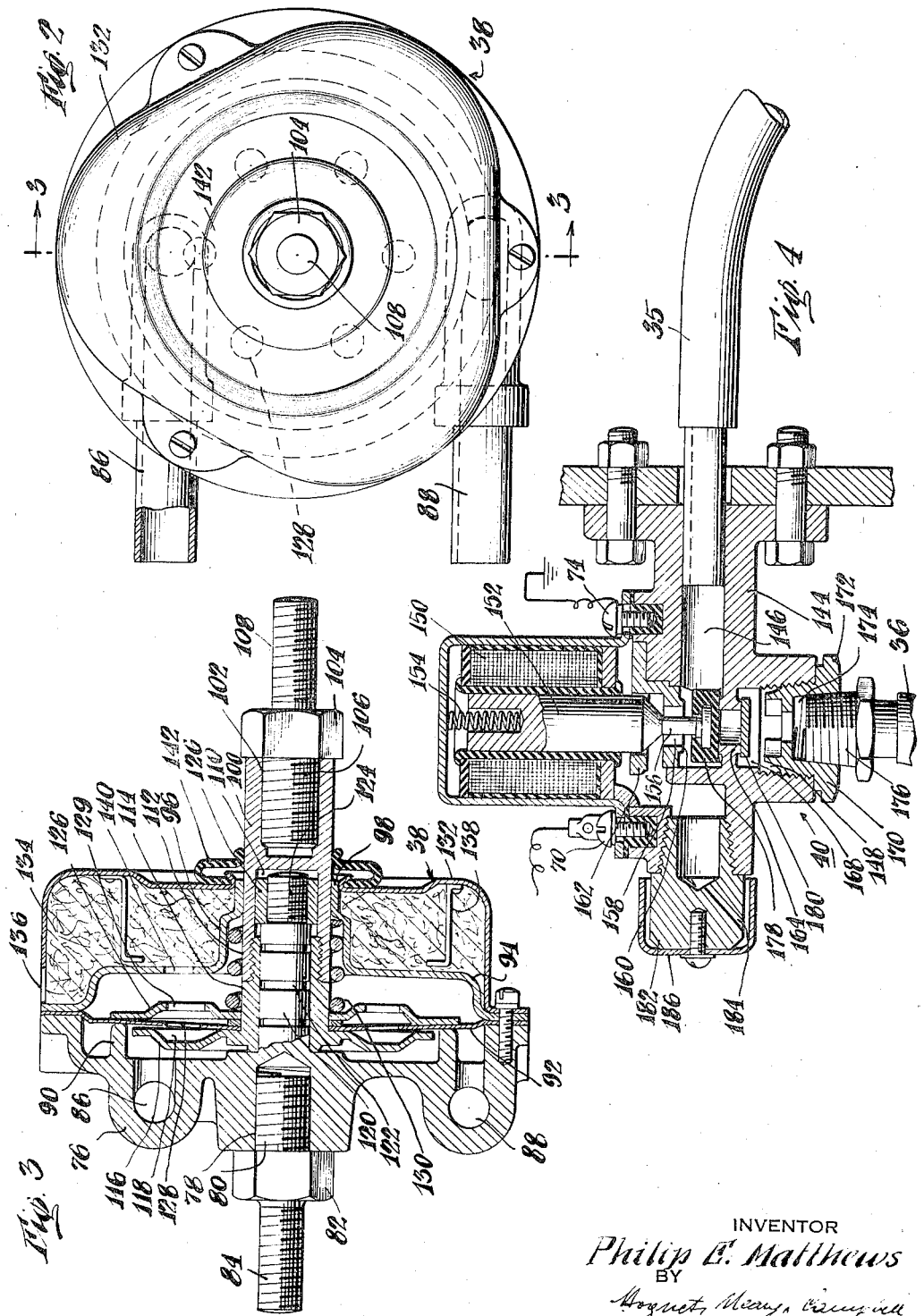

Patented July 16, 1940

2,208,133

UNITED STATES PATENT OFFICE 2,208,133

VACUUM CLUTCH CONTROL

Philip E. Matthews, Plainfield, N. J., assignor to Mack Manufacturing Corporation, Long Island City, N. Y., a corporation of Delaware Application April 27, 1938, Serial No. 204,555

8 Claims. (Cl. 192—.01)

This invention relates to clutch actuating mechanisms and relates particularly to devices for overcoming the wear on clutches of vehicles, which is caused by slippage of the clutch elements during and after shifting gears, and during normal operation of such vehicles.

One of the most common causes of premature failure of clutches and clutch facings in vehicles is slippage of the clutch elements. Most clutches are provided with pressure exerting springs which urge the clutch elements into engagement with sufficient pressure to prevent slippage. The clutch pedal leverage, however, is related to the spring pressure so that the clutch pedal may be depressed without excessive effort to disengage the elements when it is desired to stop the vehicle or to shift gears. Stated in another way, the effort required to release the clutch is not excessive, but the clutch elements are normally forced so strongly into engagement that slippage between the elements is avoided. This nice balance of clutch pressures and effort to disengage the clutches is common to substantially all vehicle clutches and results in satisfactory operation, without slippage, so long as the clutch is properly manipulated. However, many drivers have the habit of allowing a foot to rest against the clutch pedal during normal driving. The slight pressure on the clutch pedal is sufficient to reduce the pressure which normally holds the clutch elements in engagement, and allows the clutch elements to slip.

Clutch slippage and resulting wear are even more common in large vehicles, particularly trucks and busses of the rear motor type. The driver of such a heavy vehicle cannot get the "feel" of the shifting mechanism and the relative speed of the motor and as a consequence allows the clutch to slip during acceleration of the vehicle. The tremendous energy utilized in accelerating large vehicles subjects the clutch facings to great friction and heat and quickly destroys them.

The practice of allowing the clutch to slip during acceleration of a vehicle, as, for example, when starting in second gear, also causes great wear on the clutches and materially reduces their effective life.

An object of this invention, therefore, is to provide mechanisms which reduce clutch slippage by overcoming the decrease in pressure on the clutch elements which is caused by riding or exerting slight pressures on the clutch pedals.

A further object of the invention is to provide mechanisms which reduce clutch slippage during acceleration of the vehicles.

An additional object of the invention is to provide mechanisms which allow easy operation of the clutch during shifting of the gears but prevent easy disengagement of the clutch elements under other operating conditions.

Other objects of the invention will become apparent as typical embodiments of the invention are disclosed hereinafter.

A typical form of the invention, by means of which the objects of the invention are attained, may include a booster element, which is rendered operative by actuation of the accelerator to such a position as would ordinarily produce a low motor speed and in response to actuation of the clutch pedal, to overcome a greater than normal resistance to disengagement of the clutch. In this form of the invention the clutch elements are normally forced into engagement by means of spring elements or other means with a considerably greater pressure than is normally used, or the leverage between the clutch pedal and the clutch actuating means is changed, so that a much greater pressure must be exerted on the clutch pedal than is normally required to disengage the clutch elements. In order to overcome this greater pressure or to reduce the amount of effort required to disengage the clutch, a booster element is provided which is responsive to movement of the clutch pedal and of the accelerator. Thus, during gear shifting, when the speed of the motor is reduced, the booster element becomes effective to aid the operator of the vehicle in disengaging the clutch. During periods of acceleration the booster element is rendered ineffective and the amount of energy required to maintain the clutch pedal in a depressed position is greatly increased, thereby causing the operator to release the pedal and allow the clutch elements to engage. Likewise during normal cruising operation of the vehicle, the booster element is ineffective and the pressure exerted by "riding" the clutch will be insufficient to cause the clutch elements to slip.

For a better understanding of this invention, reference may be had to the accompanying drawings, in which:

Figure 2 is an end view of one form of valve utilized in the invention;

Figure 3 is a view in section taken on line 3—3 of Figure 2; and

Figure 4 is a vertical section of a solenoid valve utilized in the embodiment of the invention disclosed in Figure 1.

Figure 1:
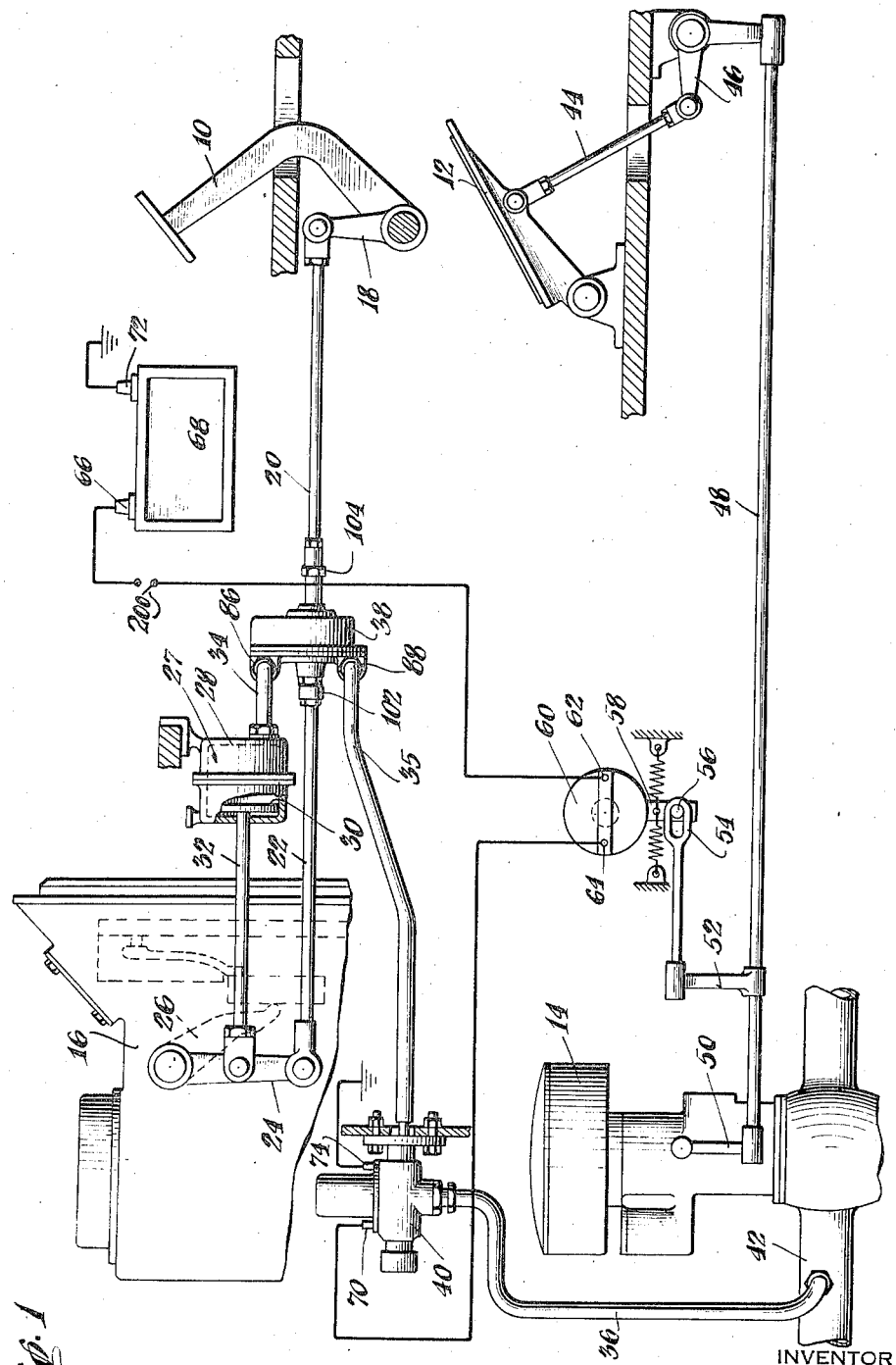
Figure 1 is a diagrammatic showing of one form of the invention as applied to a rear motor type of vehicle.

In Figure 1 of the drawings is illustrated a typical embodiment of the invention which includes a clutch pedal 10, an accelerator pedal 12, a carburetor 14, and the transmission and clutch end of a motor 16, which may be situated or positioned at the rear end of a motor vehicle, the details of which are not shown, since they do not constitute the subject matter of the present invention.

The clutch pedal 10 is provided with a lever 18 which is connected by suitable links 20 and 22 to a lever 24, which is fixedly connected to a clutch actuating yoke or arm 26. The yoke 26 bears against one of the clutch elements, which may be urged by means of springs or other equivalent constructions into engagement with the cooperating clutch element. The springs utilized in forcing the clutch elements into engagement may have greater compression or tension strength than the springs normally used in the clutches of similar motor vehicles, or the leverage exerted by the clutch pedal 10 upon the clutch yoke may be varied so that a greater pressure must be exerted on the clutch pedal 10 than is normally required to disengage the clutch elements.

Typical forms of this invention which have been applied to motor vehicles have been so arranged that the pedal effort required to cause the clutch to begin to slip was raised from a normal of about 15 to 20 pounds to 50 to 55 pounds and the effort required to disengage the clutch completely was raised to 95 to 100 pounds. The increase in clutch pressure or effort required to disengage the clutch may be varied in accordance with the type of vehicle to which the device is to be applied.

Despite the desirable increase in clutch pressure, my invention allows the clutch pedal to be depressed during the shifting of gears with as little or even less effort than is required in the usual type of vehicle. This result is obtained through the provision of a booster element 27 consisting of a cylinder 28 attached to the frame of the vehicle and containing a movable piston 30, which is connected by a link 32 to the clutch yoke lever 24. The booster 27 is connected by suitable conduits 34, 35 and 36 to a clutch pedal responsive valve 38, a solenoid valve 40 which is responsive to movement of the accelerator pedal 12, and the intake manifold 42 of the carburetor 14. The arrangement of these parts is such that while the motor is idling or only slightly above idling speed the solenoid valve 40 is open, allowing the suction effect of the intake gases at the carburetor to create a reduced pressure in the conduit 36. The valve 38 is normally closed when no pressure or only slight pressure is exerted on the clutch pedal. However, when the clutch pedal is depressed the valve 38 is opened and if the motor is idling or only slightly above idling speed, reduced pressure or vacuum is created in the booster cylinder 28, thereby drawing the piston 30 to the right, as viewed in Figure 1, and aiding the operator of the vehicle to disengage the clutch elements.

The action of the solenoid valve 40 is controlled by the accelerator pedal 12 so that depression or release of the pedal controlling the rate of operation of the motor directly controls the opening and closing of the solenoid valve 40. As shown in Figure 1, the accelerator pedal 12 is connected by a link 44 to a bellcrank 46, pivotally mounted beneath the floorboard of the vehicle. The bellcrank lever 46 is connected by means of a link 48 to the throttle valve controlling lever 50, in the usual way.

Mounted on the link 48 is an L-shaped arm 52, having a slotted free end portion 54 thereon. The slotted end portion receives a pin 56, carried on a lever 58, which projects from a rotary or single pole switch 60. The switch 60 is provided with a pair of contacts 62 and 64, which are electrically connected to one terminal 66 of a storage battery 68 and one tap 70 of the solenoid coil valve 40. A switch 200, which may be the ignition switch for the motor, is connected between the terminals 66 and the tap 70 for breaking the electrical circuit between the solenoid and the storage battery when the vehicle is not in use. The other terminal 72 of the storage battery and the other tap 74 of the solenoid of valve 40 are connected to ground. The slotted end portion 54 of the arm 52 allows sufficient play or movement of the link 48 to permit slight acceleration of the vehicle without breaking the circuit between the storage battery 68 and the solenoid of valve 40. However, when the acceleration or the motor speed exceeds a certain predetermined value, the switch 60 is rotated to break the circuit between the storage battery 68 and the solenoid of valve 40, thereby allowing the valve 40 to close.

One form of the valve 38 which is of known type, is illustrated in Figures 2 and 3. The valve 38 consists of a rigid generally cup-shaped casing 76 having a centrally disposed threaded bore 78 therein for receiving the threaded end 80 of a bolt 82. The bolt 82 is provided with an oppositely directed threaded portion 84, which may be threaded into link 22 and allows adjustment of the effective length of the link 22 after the fashion of a turn buckle. The casing 76 is provided with parallel conduits 86 and 88 which communicate with and are connected to the flexible conduits 34 and 35, respectively. The conduit or bore 88 is the inlet conduit and the bore 86 is the outlet conduit of this valve. The inlet and outlet conduits 86 and 88 are disposed on opposite sides of an annular ring 90, which projects from the inner face of the casing 76 and cooperates with a diaphragm 92 to connect and disconnect the inlet and exhaust conduits 88 and 86. The diaphragm 92 is fixed to the peripheral face of the casing 76 and is retained thereagainst by means of a shell 94 which is bolted thereto. The shell 94 is provided with a centrally disposed tubular portion 96 having a portion of restricted area 98 for receiving a shiftable, partly tubular rod 100. The rod 100 is provided with an internally threaded portion 102 which receives a bolt 104 having oppositely directed threaded ends 106, 108 and which, like bolt 82, allow adjustment of the effective length of the link 20. The opposite end of the rod 100 is provided with a bore 110 having a threaded portion 112 at its outer end. The threaded portion 112 engages a tubular element 114 which projects from the center portion of a disk member 116, having an annular concentric depression 118. The disk member 118 and tubular member 114 are slidably mounted on a stud 120, which projects from the center of the casing 76. The stud 120 may be provided with oil grooves 122 and has a reduced threaded portion 124 at its outer end for receiving a cylindrical nut 126 of greater diameter than the internal diameter of the tubular member 114, but closely fitting the bore 110 of rod 100. The length of the stud 120 is greater than the length of the tubular member 114, thereby allowing the tubular member and the connected rod 100 and link 20 to move a short distance relatively to the casing 76.

The movement of the rod 100 relative to the casing 76 is utilized to make and break communication between the inlet and outlet conduits 88 and 86. The diaphragm 92 is provided with a central aperture through which the sleeve 114 passes. The diaphragm 92 is fixed to the sleeve 114 by means of a washer or nut and is disposed between the disk 116 and a second spaced disk 126, having a concentric annular depression therein and which is also mounted on the sleeve 114 and movable therewith. The diaphragm 92 and the disk 126 are provided with apertures 128 and 129, respectively, for allowing communication between the outside atmosphere and the outlet or exhaust conduit 86.

Normally the diaphragm is urged to the left, as viewed in Figure 3, by means of a spring 130, which bears against the central portion of the disk 126 and the restricted portion 98 of the sleeve 96, thereby urging the diaphragm against the outer edge of the annular ring 90 on the housing 76 and preventing the inlet conduit 88 from communicating with the discharge conduit 86. When the clutch pedal 10 is depressed, the rod 100 is moved to the right until the end of the sleeve 114 engages the cylindrical nut 120. During this movement the diaphragm 92 is moved out of engagement with the annular ring 90 and the disk 116 is brought into engagement with the left hand face of the diaphragm 92. Movement of the diaphragm 92 allows it to clear the ring 90 and allows direct communication of the inlet conduit 88 with the outlet conduit 86. At the same time the disk 116, by coming into abutment with the diaphragm at a zone outside the apertures 128, seals the apertures 128 against communication with the atmosphere and allows the pressure reduction created by passage of air through the intake manifold 42 of the carburetor to reduce the pressure in the booster 26, if the solenoid valve 40 is open. When the clutch pedal is depressed further the whole valve 38 moves with the links 20 and 22, acting as a connector between them to aid in moving the lever 24 for releasing the clutch.

When the clutch pedal 10 is released the spring 130 forces the diaphragm to the left breaking communication between the inlet and outlet conduits 88 and 86, respectively, and the disk 116 moves out of engagement with the diaphragm 92, thereby allowing air to pass from the outside of the device, through the apertures 128 and 129, in the diaphragm 92 and disk 126, respectively, whereby piston 30 can move to the left and the clutch elements again come into engagement.

If desired an air filtering construction may be provided on the valve 38 which may consist of a casing 132, enclosing the shell 94, and being filled with some filtering material, such as, for example, copper wool 134. Air may be drawn through this filtering medium from an aperture or series of apertures 136 in the casing 132 around baffles 138 and through one or more apertures 140 in the shell 94. The casing 132 may also be provided with a gasket 142 between the rod 100 and the casing, thereby preventing dust or other material from entering the interior of the valve.

The solenoid valve 40 which is of known type is best shown in Figure 4 and may consist of a metallic valve casing 144 having a longitudinal passage 146 therein, which may be connected in any suitable way to the flexible conduit 35. A transverse or right angle passage 148 is formed in the valve casing and communicates with the longitudinal passage 146. In alignment with but on the opposite side of the casing from the passage 148 is mounted a solenoid 150 having an armature 152 slidable therein and normally urged toward the passage 148 by means of a spring 154 engaging the end of the armature. The armature 152 is provided with a reduced neck 156 which passes through a restricted but greater diameter aperture 158 in a valve seat 160, the valve seat being disposed adjacent the longitudinal passage 146. The valve seat 160 is provided with a spaced flange 162 having an aperture therein for receiving a portion of the armature 152 and providing a space through which air may be drawn through the aperture 158 into the longitudinal passage 146. A similar valve seat 164 is disposed in alignment with the valve seat 160 but on the opposite side of the longitudinal passage 146. The valve seat 164 is provided with an aperture which communicates with an enlarged chamber 168 at the inner end of the transverse passage 148. The chamber 168 is closed by means of a plug 170 having a castellated upper end 172 and an internally threaded portion 174 for receiving a coupling 176, which is connected to the conduit 36.

The reduced portion 156 of the armature 152 carries a valve plug 178, preferably made of rubber, which may be brought into a sealing relationship with either of the valve seats 160 and 164. The chamber 168 contains a disk valve 180 which may also seal the aperture in the valve seat 164 under certain circumstances. The left hand end of the valve casing 144, as viewed in Figure 4, may be provided with a removable plug 182 having a breather aperture 184 therein, which permits the communication between the outside atmosphere and the longitudinal passage 146 when the valve 178 is in its lower or closed position. The plug 182 may be provided with a cap 186 having its periphery spaced from the periphery of the plug and which acts to prevent the entry of foreign material into the valve 40.

In operation when the accelerator pedal 12 is in its upper or idling position, the switch 60 is closed, completing the circuit through the storage battery and the solenoid valve 40, energizing the solenoid 150 and moving the armature 152 with the valve plug 178 into its uppermost position. The position of the valve plug 178, therefore, is such as to allow direct communication between the intake manifold 42 and the valve 38. The disk valve 180 normally rests upon the castellated portion 172 of the fitting 170, allowing free passage of air from the valve 38 through the valve 40. When the accelerator 12 is depressed far enough to cause switch 60 to break the circuit between the storage battery 68 and the solenoid valve 40, the spring 154 forces the armature 152 downwardly and the valve plug 178 into engagement with the valve seat 164, thereby breaking the connection or sealing the intake manifold of the carburetor from the valve 38. The valve plug 178 at the same time clears the valve seat 160 and allows communication between the outside air through the greather aperture 184 and the valve 38. In the event of a backfire through the carburetor, the disk valve 180 will be blown upwardly from the castellated portion 172 against the underside of the valve seat 180 and will prevent damage to any of the parts communicating therewith.

By proper regulation of the booster device 26, the actual clutch actuating pressures during gear shifting and while the motor is idling may be reduced well below those normally required to actuate the clutch and at the same time will allow the use of greater clutch pressures during normal operation of the vehicle. It will thus be seen that a simple yet effective mechanism has been produced for overcoming the wear of clutches, which results from clutch slippage. It will be understood, of course, that the relationship and construction of the parts may be varied, as desired, and other types of valves and booster mechanisms may be used in the place of those specifically illustrated without departing from the invention.

The above described embodiment of the invention should therefore be considered as illustrative, only, and not as limiting the scope of the following claims.

I claim:

1. A device for reducing clutch slippage in vehicles having a motor, a clutch and a member for controlling the speed of the motor, comprising manually actuated means for releasing the clutch, booster means for supplying additional energy for releasing said clutch and means operatively connected to the member and the manually actuated means rendering the booster means effective when the member is in a position normally causing the motor to operate at low speed and the means for releasing the clutch is actuated.

2. In a device for reducing clutch slippage in vehicles having a motor, a clutch and a member for controlling the speed of operation of the motor, the combination of manually actuated means for releasing the clutch, fluid actuated booster means for supplying additional energy for releasing the clutch, and valve means for rendering said booster means effective and ineffective actuated by the member and the means for releasing the clutch to render the booster means ineffective when the member is in a position normally causing the motor to operate at high speed.

3. In a device for reducing clutch slippage in vehicles having a motor, a clutch and a member for controlling the speed of operation of the motor, the combination of manually actuated means for releasing the clutch, fluid actuated booster means for supplying additional energy for releasing the clutch, and valve means for rendering said booster means effective and ineffective actuated by the member and the means for releasing the clutch to render the booster means effective when the member is in a position normally causing the motor to operate at low speed and the means for releasing the clutch is actuated.

4. In a device for reducing clutch slippage in vehicles having a motor, a clutch and a member for controlling the speed of operation of the motor, the combination of manually actuated means for releasing the clutch, vacuum actuated booster means for supplying additional energy for releasing the clutch, vacuum producing means and valve means operatively connecting the booster and the vacuum producing means and actuated by the member and the means for releasing the clutch to render the booster means ineffective when the member is in a position normally causing the motor to operate at high speed and effective when the member is in a position normally causing the motor to operate at low speed and the means for releasing the clutch is actuated.

5. In a device for reducing clutch slippage in vehicles having a motor, a clutch and a member for releasing the clutch and means movable between low and high speed positions for controlling the speed of operation of the motor, the combination with the clutch releasing member of a vacuum actuated booster operatively connected to and for facilitating the release of the clutch, vacuum producing means associated with the booster, and means actuated by the motor control means and the clutch releasing member for connecting the vacuum producing means to the booster when the motor control means is in low speed position and the member is actuated, and disconnecting the booster from the vacuum producing means when the motor speed control is in high speed position.

6. The device set forth in claim 5 in which the means actuated by the motor control means and the clutch releasing means, comprise a solenoid valve electrically actuated in response to movement of the motor control means, and a diaphragm valve actuated in response to movement of the clutch releasing means.

7. In a clutch releasing device for motor vehicles having an accelerator, the combination with a clutch of booster means for aiding in releasing the clutch, means for energizing the booster, a member for manually releasing the clutch, means connecting said member to the clutch comprising a valve operatively connected to the booster means and the means for energizing the booster and having cooperating elements for allowing communication between the booster and the energizing means when the member is actuated to release the clutch, and a solenoid valve operatively connected to the booster means and the means for energizing the booster means, means actuated by the accelerator for rendering the solenoid valve operative to allow and prevent communication between the booster means and the means for energizing the booster means.

8. In a device for reducing clutch slippage in vehicles having a motor, movable means for controlling the rate of operation of the motor, a clutch and a manually operated member for releasing the clutch; the combination with the clutch releasing member and the means for controlling the rate of the operation of the motor of vacuum operated booster operatively connected to and for facilitating the release of the clutch, vacuum producing means for actuating said booster, means interposed between said booster and said vacuum producing means for controlling operation of said booster comprising a normally closed valve associated with and opened by actuation of the clutch releasing member, a solenoid valve, a source of electrical energy, a switch for electrically connecting said source to and disconnecting said source from said solenoid valve, said solenoid valve being open when said switch is closed and closed when said switch is open, and means connecting said switch to the motor controlling means for opening said switch when the motor control means is moved beyond a predetermined point.

PHILIP E. MATTHEWS.